US011754436B2

(12) United States Patent
Sheplak et al.

(10) Patent No.: US 11,754,436 B2
(45) Date of Patent: Sep. 12, 2023

(54) HIGH-FREQUENCY RECIPROCAL TRANSDUCER CALIBRATION

(71) Applicant: University of Florida Research Foundation, Incorporated, Gainesville, FL (US)

(72) Inventors: Mark Sheplak, Gainesville, FL (US); David A. Mills, Gainesville, FL (US)

(73) Assignees: UNIVERSITY OF FLORIDA RESEARCH FOUNDATION, INCORPORATED, Gainesville, FL (US); INTERDISCIPLINARY CONSULTING CORPORATION, Gainesville, FL (US)

( * ) Notice: Subject to any disclaimer, the term of this patent is extended or adjusted under 35 U.S.C. 154(b) by 400 days.

(21) Appl. No.: 17/036,766

(22) Filed: Sep. 29, 2020

(65) Prior Publication Data

US 2021/0096018 A1    Apr. 1, 2021

Related U.S. Application Data

(60) Provisional application No. 62/908,558, filed on Sep. 30, 2019.

(51) Int. Cl.
    *G01H 3/00*    (2006.01)
    *G01D 18/00*   (2006.01)
    *G01N 29/30*   (2006.01)
(52) U.S. Cl.
    CPC .......... *G01H 3/005* (2013.01); *G01D 18/002* (2013.01); *G01N 29/30* (2013.01)

(58) Field of Classification Search
    CPC .......... G01H 3/005; G01H 9/00; G01N 29/30; G01D 18/002; G01D 18/00
    USPC ............................................. 367/13
    See application file for complete search history.

(56) References Cited

PUBLICATIONS

Prasad, Suryanarayana A.N. et al. *Analytical Electroacoustic Model Of A Piezoelectric Composite Circular Plate*, AIAA Journal, vol. 44, No. 10, Oct. 2006, pp. 2311-2318. DOI: 10.2514/1.19855.
Prasad, Suryanarayana A.N. *Two-Port Electroacoustic Model Of A Piezoelectric Composite Circular Plate*, Doctoral Dissertation, University of Florida, (2002), (167 pages), In 43$^{rd}$ AIAA/ASME/ASCE/AHS/ASC Structures, Structural Dynamics and Materials Conference, Denver, CO.
Williams, Matthew D. et al. *An AlN MEMS Piezoelectric Microphone For Aeroacoustic Applications*, Journal of Microelectromechanical Systems, vol. 21, No. 2, Apr. 2012, pp. 270-283.
Williams, Matthew D. *Development Of A MEMS Piezoelectric Microphone For Aeroacoustic Applications*, Doctoral Dissertation, University of Florida, (2011), (260 pages).

*Primary Examiner* — Daniel L Murphy
(74) *Attorney, Agent, or Firm* — Alston & Bird LLP

(57) ABSTRACT

A high-frequency dynamic pressure transducer calibration system and method is provided. The method directs a source onto a diaphragm of a dynamic pressure transducer. An oscillating voltage at a target frequency (or range of frequencies) is generated. The oscillating voltage is coupled to an electrical connector of the dynamic pressure transducer. A deflection pattern of the diaphragm is recorded. The dynamic pressure transducer is calibrated by correlating magnitude of the deflection pattern with the oscillating voltage as a function of the target frequency (or range of frequencies).

21 Claims, 6 Drawing Sheets

HIGH-FREQUENCY RECIPROCAL TRANSDUCER CALIBRATION

CROSS-REFERENCE TO RELATED APPLICATIONS

The present application claims priority to U.S. Provisional Application Ser. No. 62/908,558, titled "HIGH-FREQUENCY RECIPROCAL TRANSDUCER CALIBRATION," filed Sep. 30, 2019, the contents of which are incorporated herein by reference in their entirety.

BACKGROUND

High-frequency oscillations in incoming airflow are critical to flow development around a high-speed vehicle.

Historically, high-frequency calibrations were performed using shock tubes to generate an impulse pressure wave containing high-frequency content. This results in nonlinear, high-amplitude pressure fluctuations, which are not ideal for calibrating sensors that are intended to be used in low-amplitude environments.

Conventional alternatives to the above method utilize shock tubes with weak diaphragms and low pressures to generate low-amplitude, high-frequency shock waves. While addressing the aforementioned amplitude issue, these alternatives, as with all shock tube methods, require a calibrated reference sensor, which then faces the same calibration challenges.

Moreover, ensuring that identical pressures are experienced by the sensor and reference sensor (or that the pressures are related by a known and consistent magnitude and phase) is a non-trivial task due to large spatial variations in pressure over short distances that can arise from standing waves, diffraction, and other artifacts of the test environment.

Through applied effort, ingenuity, and innovation many deficiencies of such systems have been solved by developing solutions that are in accordance with the embodiments of the present invention, many examples of which are described in detail herein.

SUMMARY

Embodiments of the present disclosure are directed to a high-frequency reciprocal transducer calibration method. In embodiments, an exemplary calibration method includes directing a source onto a diaphragm of a reciprocal transducer. The method further includes coupling a first oscillating voltage with an electrical connector of the reciprocal transducer. The method further includes comparing a deflection pattern of the diaphragm caused in part due to the first oscillating voltage coupled to the electrical connector. The method further includes signaling when a correlation between a magnitude of the deflection pattern with the first oscillating voltage as a function of a frequency of the first oscillating voltage meets or exceeds a calibration correlation condition.

Systems and computer program products corresponding to the above-summarized methods are also described and claimed herein.

Additional features and advantages are realized through the techniques of the present disclosure. Other embodiments and aspects of the disclosure are described in detail herein and are considered a part of the claimed disclosure. For a better understanding of the disclosure with advantages and features, refer to the description and to the drawings.

BRIEF DESCRIPTION OF THE FIGURES

The subject matter which is regarded as the disclosure is particularly pointed out and distinctly claimed in the claims at the conclusion of the specification. The foregoing and other objects, features, and advantages of the disclosure are apparent from the following detailed description taken in conjunction with the accompanying drawings in which:

Figure 1A:
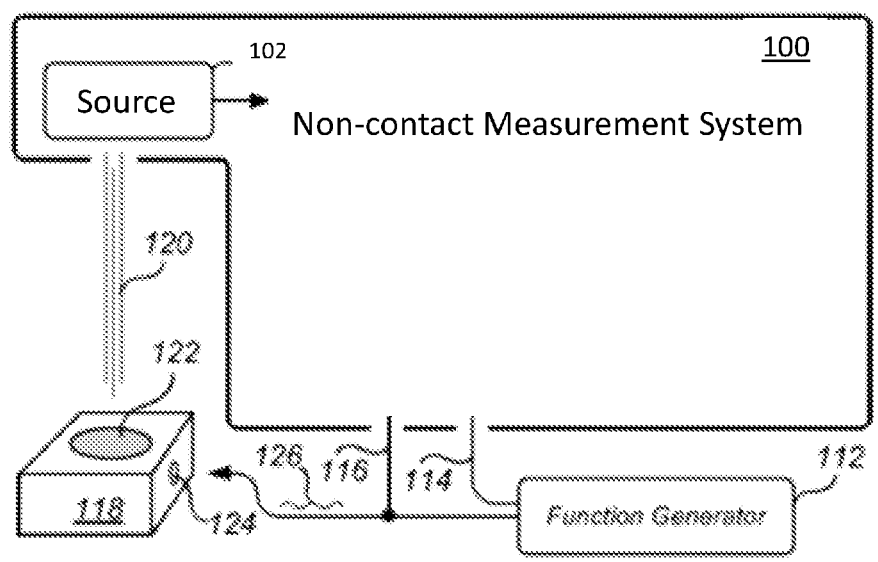
FIGS. 1A and 1B illustrate an exemplary high-frequency reciprocal transducer calibration system, according to embodiments of the present disclosure.

The detailed description explains the preferred embodiments of the disclosure, together with advantages and features, by way of example with reference to the drawings.

DETAILED DESCRIPTION

Embodiments of the present disclosure directly enable high-frequency calibration of reciprocal transducers without the shortcomings associated with pressure-driven calibrations.

In an exemplary embodiment, the reciprocal nature of piezoelectric transduction to reverse the drive direction enables calibration via an electrical actuation method. Specifically, piezoelectric pressure sensors are a primary subject of calibration; however, the methods, hardware, and software are extensible to other sensors using reciprocal transduction methods such as piezoelectric microphones and electrostatic-transduction based sensors.

The terms "reciprocal" and "reciprocality" refer to an effect or feature by which a force at a target frequency (or range of frequencies) is applied against an active piezoelectric element, which then produces a corresponding electrical voltage at an electrical connector. Then, in a reciprocal manner, an oscillating voltage at the target frequency (or range of frequencies) applied to the electrical connector, causes a corresponding deflection of an equivalent or related profile of the diaphragm. It will be appreciated that the deflection profiles do not have to be exactly the same, as long as a relationship between the two is known. Correlating the diaphragm deflection caused by the applied force with deflection caused by the oscillating voltage (e.g., at the same target frequency (or range of frequencies)) allows the dynamic pressure transducer to be profiled and calibrated. This gives rise to the reciprocal nature of similarly oscillating pressure waves and voltage oscillations at a target frequency (or range of frequencies).

The term "sweeping" is used herein in reference to sweeping a laser beam across a diaphragm surface and is intended to mean making successive readings of the deflection of the diaphragm as the laser beam is relocated at different points on the surface of the diaphragm such that a complete digital construction forming a deflection pattern of the diaphragm can be generated.

The reciprocal transducer (e.g., dynamic pressure transducer) may exhibit reciprocal behavior in that when a pressure wave (e.g., a source or force) at a target frequency (e.g., or range of frequencies) is applied against the diaphragm of the transducer (e.g., a first deflection pattern), a first oscillating voltage at the target frequency (e.g., or range of frequencies) is produced by the diaphragm and coupled to an electrical connector of the transducer. That is, the pressure wave may cause the first oscillating voltage to be produced by the diaphragm. Similarly, a second oscillating voltage at the target frequency (e.g., or range of frequencies) applied to the electrical connector causes the diaphragm to deflect (e.g., a second deflection pattern). That is, the applied second oscillating voltage causes deflection by the diaphragm. The first deflection pattern may be related to the second deflection pattern. For example, the first oscillating voltage produced by the diaphragm due to the pressure wave may not necessarily be the same as the second oscillating voltage required to move (e.g., cause deflection of) the diaphragm; however, the first oscillating voltage and the second oscillating voltage may be related.

The relation between the first deflection pattern (e.g., the first oscillating voltage) and second deflection pattern (e.g., the second oscillating voltage and/or the diaphragm deflection) can be used in conjunction with electrical actuation at higher frequencies (e.g., of up to one megahertz (MHz) and beyond to several MHz) to calibrate the dynamic pressure transducer—a range in which conventional pressure wave techniques become otherwise inaccurate and/or unattainable.

Accordingly, embodiments of the present disclosure provide a multitude of advantages over conventional solutions. For example, while simulating pressure waves in a test environment is possible at low frequencies (e.g., less than 20 kHz), higher frequency pressure waves in the MHz and beyond range are not easily simulated. Advantageously, calibration of reciprocal transducers at such exemplary and other higher target frequencies is enabled by embodiments of the present disclosure.

For example, utilizing the reciprocal nature between pressure waves and electrical actuation at a target frequency (or range of frequencies), the present disclosure calibrates reciprocal transducers to frequencies up to several MHz. Applications of such required calibrations include, for example, vehicles traveling generally at speeds of Mach 5 and higher. At such speeds, the flow regime where aerothermal effects are present is of great importance. In addition, at these speeds, high-frequency oscillations in the incoming airflow are critical to the flow development around the vehicle. In view of such critical parameters, the present disclosure provides a calibration technique that is far superior to conventional pressure wave techniques.

Figure 1B:
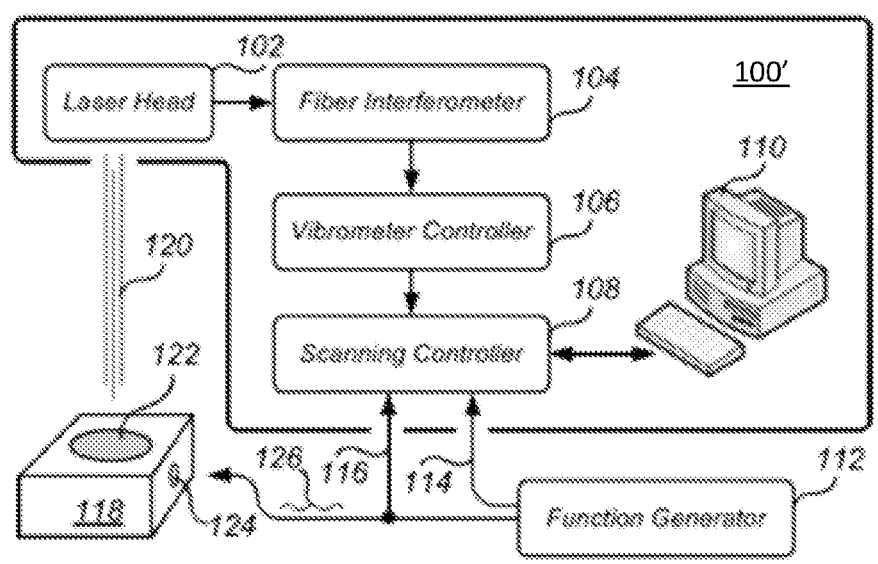

FIGS. 1A and 1B illustrate an exemplary high-frequency reciprocal transducer calibration system, according to embodiments of the present disclosure. In embodiments, a reciprocal transducer 118 comprises a diaphragm 122 and an electrical connector 124.

In FIG. 1A, a non-contact measurement system 100 is configured to direct a source 102 toward a first component (e.g., diaphragm 122) of the reciprocal transducer 118. For example, the non-contact measurement system 100 may include an optical velocity/displacement measurement system configured to direct light onto the diaphragm. In other examples, the non-contact measurement system 100 may include a white-light optical profilometer. In other examples, the non-contact measurement system 100 may include a laser vibrometer configured to direct a laser beam toward the diaphragm.

An oscillating voltage generator 112 (e.g., a function generator) may set an oscillating voltage 126 at a target frequency (or range of frequencies). The oscillating voltage 126 is coupled to the electrical connector 124 and a deflection pattern 300 (see, e.g., FIG. 2) of the diaphragm 122 (e.g., resulting from the application of the oscillating voltage 126) is recorded, by way of the measurement system 100. The dynamic pressure transducer 118 is calibrated by correlating the magnitude of the deflection pattern 300 with the oscillating voltage 126 as a function of the target frequency (or range of frequencies). The function generator 112 also provides a trigger signal 114 for synchronization and a reference oscillating voltage 116.

As part of the calibration, electrical impedance can be measured over a frequency range. The frequency range is preferably between one hertz and one megahertz; however, in other exemplary embodiments, the frequency range can approach several megahertz.

Also, as part of the calibration, a frequency response profile of the reciprocal transducer 118 can be created by varying the target frequency (or range of frequencies) over a frequency range and recording results. The frequency range may preferably be between one hertz and one megahertz. In other exemplary embodiments, the frequency range can approach several megahertz.

In an example, the deflection pattern 300 can be compared to manufacturer specifications or other known parameters or characteristics of the transducer 118 to determine if the reciprocal transducer 118 is within specifications or meets desired conditions. If the deflection pattern 300 fails to be within the reciprocal transducer manufacturer specification, the measurement system 100 may signal or transmit a signal representing an alarm condition or failed calibration. The failed sensor 118 can be removed from production and/or other appropriate steps can be taken, as may be required and/or desired in a particular embodiment.

In an exemplary embodiment, the reciprocal transducer is a piezoelectric pressure transducer, a piezoelectric microphone transducer, or an electrostatic transduction sensor.

In an alternative embodiment depicted in FIG. 1B, a laser vibrometer system 100' is orientated to project a laser beam 120 onto the diaphragm 122 of the dynamic pressure transducer 118. The laser beam 120 may be split, passing a portion of the laser or optical beam 120 to a fiber interferometer 104. In an exemplary embodiment, the fiber interferometer 104 can implement a Bragg-cell.

The optical beam then passes to a vibrometer controller 106 and from the vibrometer controller 106 to a scanning controller 108. In embodiments, the vibrometer controller 106 may control the alignment and functionality of the vibrometer system 100.

The scanning controller 108 is interconnected with a data processing device 110 so that the laser vibrometer system 100 can record a deflection pattern 300 of the diaphragm 122 by sweeping the laser beam 120 across the diaphragm 122 surface.

In an exemplary embodiment, the laser vibrometer system 100' can comprise a laser head 102, a fiber interferometer 104, a vibrometer controller 106, a scanning controller 108, and a data processing device 110. The data processing device 110 can be a smartphone, tablet, personal computer, laptop, or other types and kinds of data processing devices, as may be required and/or desired in a particular embodiment.

Figure 2:
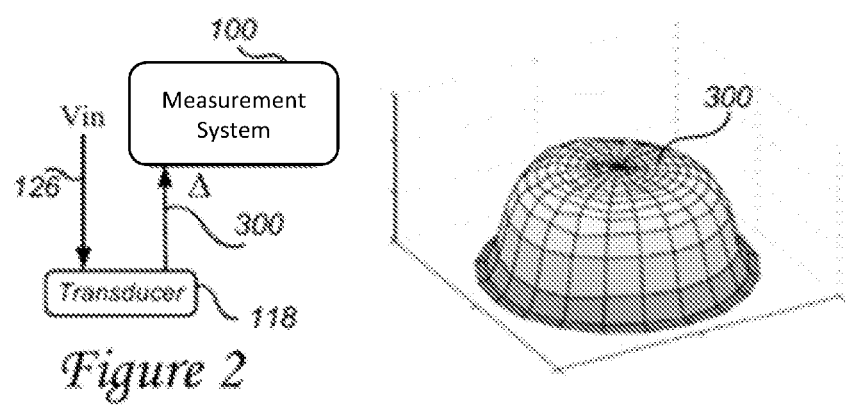
FIG. 2 illustrates exemplary operations for applying an oscillating voltage at a target frequency or range of frequencies to create a corresponding deflection pattern, according to embodiments of the present disclosure.

FIG. 2 illustrates exemplary operations for applying an oscillating voltage at a target frequency (or range of frequencies) to create a corresponding deflection pattern, according to embodiments of the present disclosure. In an exemplary embodiment, a Vin oscillating voltage 126 at a target frequency (or range of frequencies) can be applied to electrical connections of a dynamic pressure transducer 118. The electro-actuation causes a delta A deflection from the normal state of the diaphragm 122 which is detectable, for example, by way of the measurement system 100. A data processing resource can collect data and produce digitally a deflection pattern 300 which can then be used for analysis and calibration by correlating magnitude of the deflection pattern 300 with the oscillating voltage as a function of the target frequency (or range of frequencies).

A normal state of the diaphragm 122 can be observed by either shorting the electrical connector connections or by completely removing the oscillating voltage 126 source so that there are no connections from the diaphragm 122 to the electrical connector 124. It will be appreciated that the terms "deflection" and "deflection pattern" as used herein in connection with the diaphragm 122 are considered as referenced from the normal state.

Figure 3:
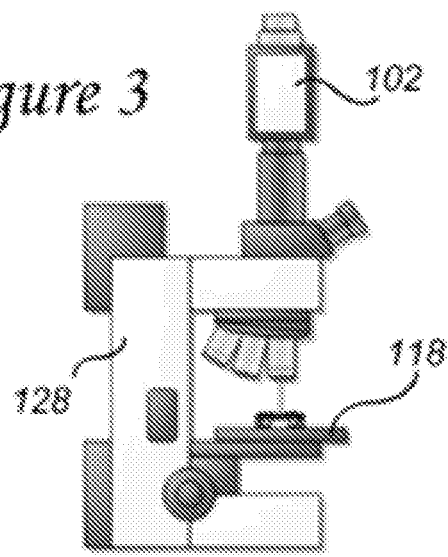
FIG. 3 illustrates an exemplary microscope-based calibration embodiment, according to embodiments of the present disclosure.

FIG. 3 illustrates an exemplary microscope-based calibration embodiment, according to embodiments of the present disclosure. Exemplary embodiments such as those depicted in FIG. 3 enable flexible bench-top testing and calibration of exemplary reciprocal transducers 118. In this regard, a standard microscope 128 can be converted, wherein a laser head 102 is mounted to the microscope head and the reciprocal transducer 118 secured to the stage of the microscope. In operation, the source 120 can be directed through the microscope and onto the diaphragm 122.

Figure 4:
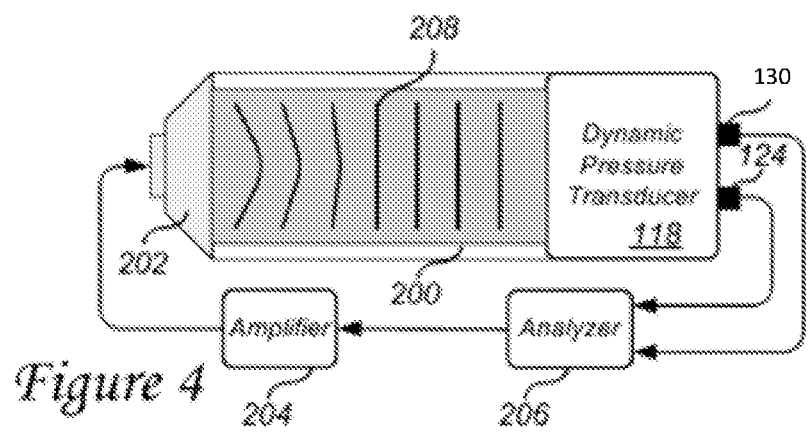
FIG. 4 illustrates an exemplary calibration apparatus, according to embodiments of the present disclosure.

FIG. 4 illustrates an exemplary plane wave tube (PWT) test apparatus, according to embodiments of the present disclosure. In embodiments, a plane wave tube (PWT) apparatus (e.g., or calibration device) 200 may be an alternative for actuation by pressure wave of the reciprocal sensor 118. Such is useful in comparing, at lower frequencies, the reciprocality of pressure wave actuation versus electrical actuation of reciprocal sensor 118, as illustrated in FIGS. 1A and 1B.

In this regard, in an exemplary embodiment, the PWT apparatus or calibration device 200 may include an acoustic driver 202 that is mounted at a first end of the calibration device 200. The reciprocal transducer 118 is mounted at a second end of the calibration device 200. In embodiments, the first end is situated opposite the second end. A pressure wave 208 is generated by way of the acoustic driver 202 (e.g., driven by an amplifier 204) that receives a target frequency (or range of frequencies) signal from an analyzer 206. A resulting voltage is measured at the electrical connector 124. Electrical signal 130 represents a voltage of a reference sensor with a known pressure response at the target frequency or range of frequencies. The resulting oscillating voltage, at the target frequency (or range of frequencies), by the calibration device method described herein can be correlated with the method of applying the electrical actuation oscillating voltage directly to the dynamic pressure transducer 118, at the target frequency (or range of frequencies) and measuring diaphragm deflection. Such correlation between methods can be used to verify the reciprocality of the reciprocal transducer. In embodiments, amplifier 204 comprises a standard signal amplifier with adjustable gain and other features, as may be required and/or desired in a particular embodiment.

Additionally or alternatively, a calibration device frequency response profile can be created by varying the pressure wave over a frequency range and recording the results. The calibration device frequency response can be correlated with the frequency response using electrical actuation to verify the reciprocality of the reciprocal transducer.

In embodiments, the calibration device may include one or more of a plane wave tube (PWT), a pistonphone, or a pressure coupler.

Figure 5:
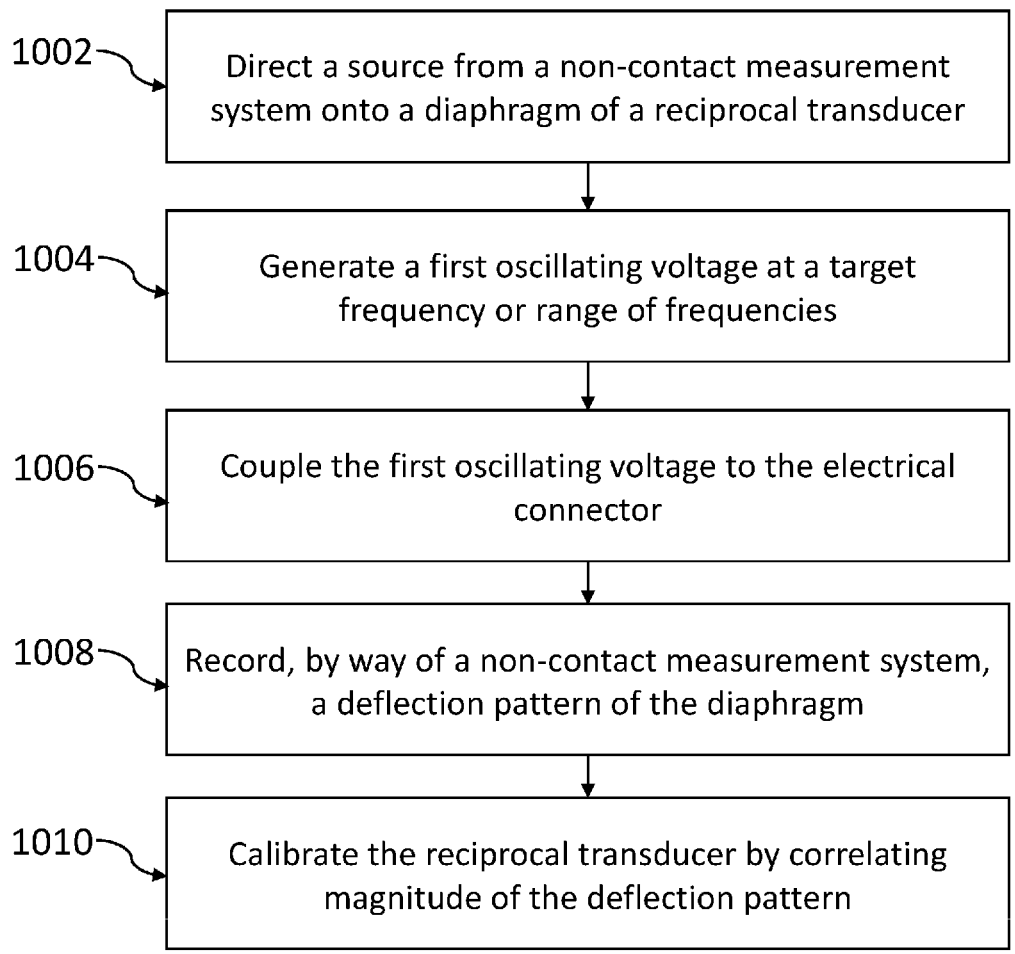
FIG. 5 illustrates an exemplary high-frequency reciprocal transducer calibration method, according to embodiments of the present disclosure.

FIG. 5 illustrates an exemplary high-frequency reciprocal transducer calibration method, according to embodiments of the present disclosure.

In embodiments, a source from an exemplary measurement system 100 is directed 1002 onto a diaphragm 122 of a reciprocal transducer 118.

In embodiments, an oscillating voltage 126 at a target frequency (or range of frequencies) is generated 1004 by way of function generator 112.

In embodiments, the oscillating voltage 126 is coupled 1006 to an electrical connector 124 of the reciprocal transducer 118.

In embodiments, deflection pattern 300 of the diaphragm 122 is recorded 1008, by way of the measurement system 100.

In embodiments, the reciprocal transducer 118 is calibrated 1010 by correlating magnitude of the deflection pattern 300 with the oscillating voltage 126 as a function of the target frequency (or range of frequencies).

In an exemplary embodiment, electrical impedance can be measured over a frequency range.

In an exemplary embodiment, a frequency response profile of the reciprocal transducer 118 can be created by varying the target frequency (or range of frequencies) over a frequency range and recording results.

In an exemplary embodiment, the frequency range is preferably between one hertz and one megahertz. In other exemplary embodiments, the frequency range can extend to several megahertz.

In an exemplary embodiment, the deflection pattern 300 can be compared to a reciprocal transducer manufacturer specification to determine if the reciprocal transducer 118 is within a specification.

In an exemplary embodiment, lumped element values can be calculated that represent each of the components in an equivalent circuit to characterize the dynamic pressure transducer 118.

In an exemplary embodiment, a pressure wave 208, at the target frequency (or range of frequencies), is generated by way of an acoustical driver 202 mounted at a first end of a calibration device 200. The reciprocal transducer 118 is mounted at a second end of the calibration device 200. The first end is opposite the second end. In an exemplary embodiment, an analyzer 206 can create the frequency signal which is amplified by way of amplifier 204 to cause the acoustic driver 202 to create a pressure wave 208. A resulting voltage is measured at the electrical connector 124. In an exemplary embodiment, the pressure wave 208 impacts the diaphragm 122 of the reciprocal transducer which causes the resulting voltage to be created at the electrical connector 124.

In embodiments, the calibration device is one or more of a plane wave tube (PWT), a pistonphone, or a pressure coupler In an exemplary embodiment, the resulting voltage is correlated with the oscillating voltage (obtained using electrical actuation), at the target frequency (or range of frequencies), to verify reciprocality of the reciprocal transducer. Reciprocality at lower frequencies validates that calibration of the reciprocal transducer 118 can be accomplished at higher frequencies where the calibration device approach may be unsuited, by way of coupling the oscillating voltage 126, at the target frequency (or range of frequencies), to the electrical connector and measuring the deflection pattern in lieu of using the calibration device. The analyzer 206 can be a combination of a function generator, oscilloscope, a data processing device 110, and/or other types and kinds of devices, as may be required and/or desired in a particular embodiment.

In an exemplary embodiment, a calibration device frequency response profile is created by varying the pressure wave 208 over a frequency range and recording results. The calibration device frequency response is compared with the frequency response (obtained using electrical actuation) to verify reciprocality of the reciprocal transducer, wherein reciprocality at lower frequencies validates that calibration of the reciprocal transducer can be readily accomplished at higher frequencies where the calibration device approach may be unsuited, by way of coupling the oscillating voltage 126 at the target frequency (or range of frequencies) to the electrical connector 124 and measuring the deflection pattern 300 in lieu of using the calibration device 200.

In an exemplary embodiment, if the deflection pattern 300 fails to be within the reciprocal transducer manufacturer's specification, an alarm condition can notify testers or other computing devices of the failed status, the failed sensor 118 can be removed from production, and/or other appropriate steps can be taken, as may be required and/or desired in a particular embodiment.

In an exemplary embodiment, the reciprocal transducer can be a piezoelectric pressure transducer, a piezoelectric microphone transducer, or an electrostatic transduction sensor.

The capabilities of the present disclosure can be implemented in software, firmware, hardware or some combination thereof.

As one example, one or more aspects of the present disclosure can be included in an article of manufacture (e.g., one or more computer program products) having, for instance, computer usable media. The media may have embodied therein, for instance, computer readable program code means for providing and facilitating the capabilities of the present disclosure. The article of manufacture can be included as a part of a computer system or sold separately.

Additionally, at least one program storage device readable by a machine, tangibly embodying at least one program of instructions executable by the machine to perform the capabilities of the present disclosure can be provided.

The flow diagrams depicted herein are examples. There may be many variations to these diagrams or the steps (or operations) described therein without departing from the spirit of the disclosure. For instance, the steps may be performed in a differing order, or steps may be added, deleted or modified. All of these variations are considered a part of the claimed disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of calibrating a high-frequency reciprocal transducer, the method comprising:
   directing a source toward a diaphragm of a reciprocal transducer;
   coupling a first oscillating voltage with an electrical connector of the reciprocal transducer;
   comparing a deflection pattern of the diaphragm to known specifications of the reciprocal transducer, wherein the deflection pattern is caused in part due to the first oscillating voltage coupled to the electrical connector; and
   signaling when a correlation between a magnitude of the deflection pattern with the first oscillating voltage as a function of a frequency of the first oscillating voltage meets or exceeds a calibration correlation condition.

2. The method of claim 1, further comprising:
   recording, by way of a non-contact measurement system, the deflection pattern of the diaphragm.

3. The method of claim 2, wherein the non-contact measurement system comprises one or more of a laser vibrometer, fiber interferometer, a vibrometer controller, a scanning controller, or a data processing device.

4. The method of claim 1, wherein the reciprocal transducer is one or more of a dynamic pressure sensor, a piezoelectric pressure transducer, a piezoelectric microphone transducer, or an electrostatic transduction sensor.

5. The method of claim 1, wherein the frequency of the first oscillating voltage is one of a target frequency or a range of frequencies.

6. The method of claim 1, wherein the source is one of a source of light or a laser.

7. The method of claim 1, further comprising:
   determining that the reciprocal transducer exhibits reciprocal behavior when (i) a second oscillating voltage is generated when a pressure wave is applied against the diaphragm and (ii) the deflection pattern is generated when the first oscillating voltage is coupled to the electrical connector.

8. The method of claim 7, further comprising:
   using a relation between the first oscillating voltage and the second oscillating voltage in calibrating the reciprocal transducer.

9. The method of claim 1, further comprising:
   measuring an electrical impedance over a frequency range.

10. The method of claim 9, wherein the frequency range is one of between one hertz and one or more megahertz.

11. The method of claim 1, further comprising:
    obtaining a frequency response profile of the reciprocal transducer by varying the frequency of the first oscillating voltage over a frequency range.

12. The method of claim 11, wherein the frequency range is between one hertz and one or more megahertz.

13. The method of claim 1, wherein the calibration correlation condition is based at least in part on manufacturer specifications or known oscillating voltage relationships associated with the reciprocal transducer.

14. The method of claim 1, further comprising:
    generating a pressure wave at the frequency of the first oscillating voltage by way of an acoustic driver mounted at a first end of a calibration device, wherein the reciprocal transducer is mounted at a second end of the calibration device, and wherein the first end is opposite the second end;

measuring a resulting voltage at the electrical connector; and correlating the resulting voltage with the first oscillating voltage at the frequency of the first oscillating voltage to verify reciprocality of the reciprocal transducer.

15. The method of claim 14, wherein the calibration device comprises one or more of a plane wave tube (PWT), a pistonphone, or a pressure coupler.

16. A high-frequency reciprocal transducer calibration system, comprising:

a reciprocal transducer comprising a diaphragm and an electrical connector;

a non-contact measurement system configured to direct a source toward the diaphragm; and an oscillating voltage generator generating a first oscillating voltage, couplable with the electrical connector and set at a frequency;

wherein the non-contact measurement system comprises at least one processor and at least one memory storing instructions that, with the at least one processor, cause the non-contact measurement system to:

compare a deflection pattern of the diaphragm to known specifications of the reciprocal transducer, wherein the deflection pattern is caused in part due to the first oscillating voltage coupled to the electrical connector; and signal when a correlation between a magnitude of the deflection pattern with the first oscillating voltage as a function of a frequency of the first oscillating voltage meets or exceeds a calibration correlation condition.

17. The system of claim 16, wherein the at least one memory stores instructions that, with the at least one processor, further cause the non-contact measurement system to:

record the deflection pattern of the diaphragm.

18. The system of claim 16, wherein the reciprocal transducer is one or more of a dynamic pressure sensor, a piezoelectric pressure transducer, a piezoelectric microphone transducer, or an electrostatic transduction sensor.

19. The system of claim 16, wherein the frequency is one of a target frequency or a range of frequencies.

20. The system of claim 19, wherein the target frequency or range of frequencies is between one hertz and one of between one hertz and one or more megahertz.

21. The system of claim 16, wherein the source is one of a source of light or a laser.

* * * * *